US010034207B2

(12) United States Patent
Jung et al.

(10) Patent No.: US 10,034,207 B2
(45) Date of Patent: Jul. 24, 2018

(54) METHOD FOR RE-SELECTING CELL BY USER EQUIPMENT AND USER EQUIPMENT USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 15/034,800

(22) PCT Filed: Nov. 7, 2014

(86) PCT No.: PCT/KR2014/010695
§ 371 (c)(1),
(2) Date: May 5, 2016

(87) PCT Pub. No.: WO2015/069064
PCT Pub. Date: May 14, 2015

(65) Prior Publication Data
US 2016/0286445 A1 Sep. 29, 2016

Related U.S. Application Data

(60) Provisional application No. 61/901,012, filed on Nov. 7, 2013.

(51) Int. Cl.
H04W 36/06 (2009.01)
H04W 24/10 (2009.01)
H04W 48/20 (2009.01)

(52) U.S. Cl.
CPC .......... *H04W 36/06* (2013.01); *H04W 24/10* (2013.01); *H04W 48/20* (2013.01)

(58) Field of Classification Search
None
See application file for complete search history.

(56) References Cited

U.S. PATENT DOCUMENTS

2011/0009126 A1* 1/2011 Lee ................. H04W 28/08
455/453
2013/0130684 A1* 5/2013 Gomes .............. H04W 8/186
455/435.1

(Continued)

FOREIGN PATENT DOCUMENTS

| WO | 2008157573 | 12/2008 |
| WO | 2013051871 | 4/2013 |
| WO | 2013151360 | 10/2013 |

OTHER PUBLICATIONS

PCT International Application No. PCT/KR2014/010695, International Search Report dated Jan. 29, 2015 2 pages.

*Primary Examiner* — Anh Ngoc Nguyen
(74) *Attorney, Agent, or Firm* — Lee, Hong, Degerman, Kang & Waimey

(57) ABSTRACT

A method for re-selecting a cell by a user equipment and a user equipment using the method are provided. The method comprises: receiving a normal frequency priority capable of being used to re-select a cell; determining whether a particular frequency satisfies a condition for applying a random priority; applying the randomly selected priority instead of applying the normal frequency priority to the particular frequency when the condition is satisfied; and re-selecting the cell on the basis of the randomly selected priority.

10 Claims, 16 Drawing Sheets

(56) References Cited

U.S. PATENT DOCUMENTS

| | | | |
|---|---|---|---|
| 2013/0258934 A1 | 10/2013 | Amerga et al. | |
| 2014/0004862 A1* | 1/2014 | Ekemark | H04W 72/06 455/443 |
| 2014/0086208 A1* | 3/2014 | Murray | H04W 36/0072 370/331 |
| 2014/0233452 A1* | 8/2014 | Kim | H04L 12/1881 370/312 |

* cited by examiner

METHOD FOR RE-SELECTING CELL BY USER EQUIPMENT AND USER EQUIPMENT USING SAME

CROSS-REFERENCE TO RELATED APPLICATIONS

This application is the National Stage filing under 35 U.S.C. 371 of International Application No. PCT/KR2014/010695, filed on Nov. 7, 2014, which claims the benefit of U.S. Provisional Application No. 61/901,012, filed on Nov. 7, 2013, the contents of which are all hereby incorporated by reference herein in their entirety.

BACKGROUND OF THE INVENTION

Field of the Invention

The present invention relates to a method for reselecting, by user equipment, a cell in a mobile communication system and user equipment using the same.

Related Art

With the advent of a new device, such as a smart phone, the amount of traffic required for a wireless communication system is explosively increased. The same is true of recently deployed long term evolution (LTE) carriers.

A common solution for handling increasing traffic, in particular, a traffic increase in a specific area called a hot spot is to use multiple carriers, that is, a plurality of carriers.

Load balancing is important when multiple carriers are used. That is, it is preferred to properly distribute loading to carriers in terms of performance improvement of a system and resource efficiency. In order to achieve load balancing for multiple carriers, various deployment scenarios according to the capacity of each carrier and the number of carriers given to a corresponding area need to be taken into consideration.

If load balancing is achieved, available frequency resources can be optimally used. Multiple carriers are spaced apart from each other in a frequency domain, the band of each carrier is different, and a different number of carriers having a different band may be used in a different area. Load balancing is important in order to efficiently use available frequency resources between such carriers.

Meanwhile, it has been known that active traffic loading and access loading are closely related to the density of UE in the idle state.

Research of current traffic models shows that a ratio of the number of active user equipment and the number of user equipment in the idle state has been a statically stabilized value. Access loading is directly related to the density of user equipment in the idle state. That is, access loading is a good metric indicative of the density of user equipment in the idle state. Access loading may be used to measure the density of user equipment in the idle state and to redistribute pieces of user equipment in the idle state.

When overload (overloading) of active traffic loading and/or access loading is present, if only access barring or active traffic redirection is performed, an overload state may continue because more user equipment in the idle state may wake up.

Furthermore, overload control may need to continue in order to perform access barring and active traffic redirection. As a result, more resources are wasted for an overload control operation, more service delay is generated, and a service stop may also be increased.

Accordingly, before overload of active traffic loading or access loading is generated, it is preferred that pieces of user equipment in the idle state are offensively redistributed.

If load balancing depends on only handover or the redirection of loading after a call is set up, more handover or more redirection of loading may be required. Accordingly, handover or redirection to another frequency for each piece of user equipment increases latency and uncertainty.

The redirection of load for active user equipment may cause handover latency because it increases signaling overhead for the user equipment or may cause a handover failure due to the limit of control channel resources.

Accordingly, the generation of overload of active traffic loading or access loading can be minimized by offensively redistributing pieces of user equipment in the idle state.

That is, for load balancing, when pieces of user equipment in the idle state reselect cells, carriers need to be properly selected so that loading is equally distributed for each carrier (i.e., frequency).

In a current cell reselection method, however, when user equipment in the idle state reselects a cell, a priority value for each carrier (frequency) is applied. A current carrier-based priority-based cell reselection method has only an on/off type load redistribution effect in carriers having different priorities.

A redistribution method for user equipment in the idle state is required for load balancing for each carrier in an area in which multiple carriers are supported. That is, there is a need for a cell reselection method for achieving load balancing in an area to which multiple carriers are applied, such as a hot spot, and user equipment using such a method.

SUMMARY OF THE INVENTION

There are provided a cell reselection method for achieving load balancing in an area to which multiple carriers are applied and user equipment using such a method.

In an aspect, a method for reselecting, by user equipment, a cell may be provided. The method may comprise receiving a normal frequency priority capable of being used for cell reselection, determining whether a condition for applying random priority to a specific frequency is satisfied, applying a randomly selected priority to the specific frequency instead of the normal frequency priority if the condition is satisfied, and performing cell reselection based on the randomly selected priority.

In another aspect, a method for reselecting, by user equipment, a cell may be provided. The method may comprise receiving a threshold and a normal frequency priority capable of being used for cell reselection, selecting a random number within a specific range, comparing the random number with the threshold and determining whether a condition in which priority P according to the normal frequency priority is adjusted is satisfied with respect to the specific frequency, adjusting the priority P for the specific frequency if the condition is satisfied, and performing cell reselection based on the adjusted priority.

In further another aspect, a user equipment performing cell reselection is provided. The UE may comprise a radio frequency (RF) unit transmitting and receiving radio signals and a processor connected to the RF unit, wherein the processor receives a normal frequency priority capable of being used for cell reselection, determines whether a condition for applying random priority to a specific frequency is satisfied, applies a randomly selected priority to the specific frequency instead of the normal frequency priority if the condition is satisfied, and performs cell reselection based on the randomly selected priority.

In further another aspect, a user equipment performing cell reselection may be provided. The UE may comprise a radio frequency (RF) unit transmitting and receiving radio signals and a processor connected to the RF unit, wherein the processor receives a threshold and a normal frequency priority capable of being used for cell reselection, selects a random number within a specific range, compares the random number with the threshold and determining whether a condition in which priority P according to the normal frequency priority is adjusted is satisfied with respect to the specific frequency, adjusts the priority P for the specific frequency if the condition is satisfied, and performs cell reselection based on the adjusted priority.

In a system in which priority for each frequency is broadcasted, loading may be concentrated on a specific frequency having higher priority because the number of UE camping on the specific frequency is increased. In accordance with the present invention, there is provided a cell reselection method which enables UE to camp on another frequency having lower priority by changing or adjusting the priority of a specific frequency if a specific condition is satisfied. Accordingly, system performance can be improved and efficiency of resource use can also be increased because load balancing can be achieved in a multiple carrier environment.

DESCRIPTION OF EXEMPLARY EMBODIMENTS

Figure 1:
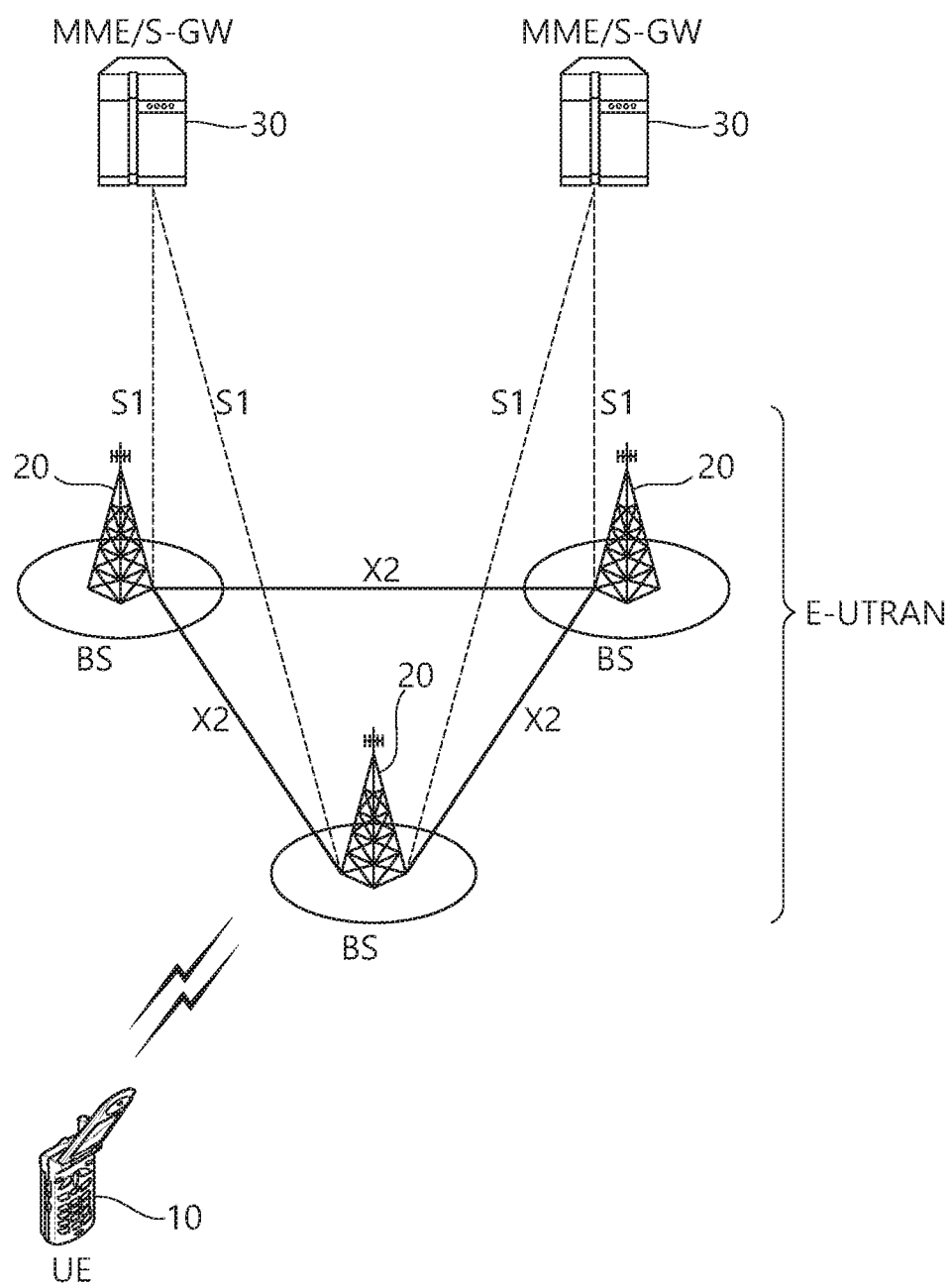
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
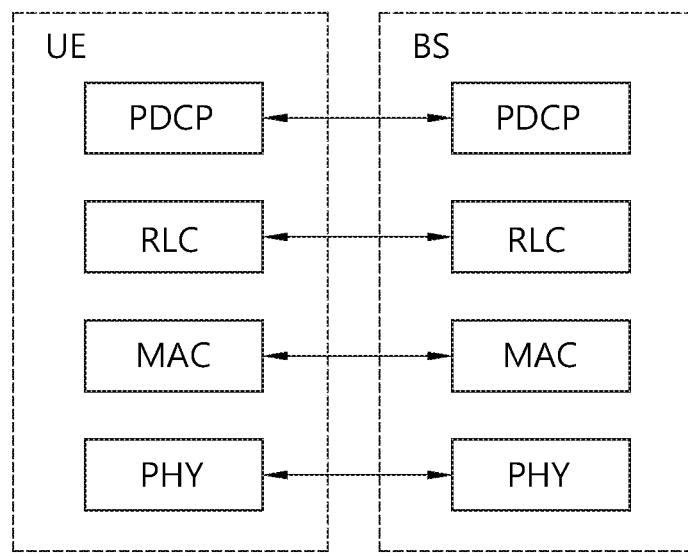
FIG. 2 is a diagram showing a wireless protocol architecture for a user plane.
Figure 3:
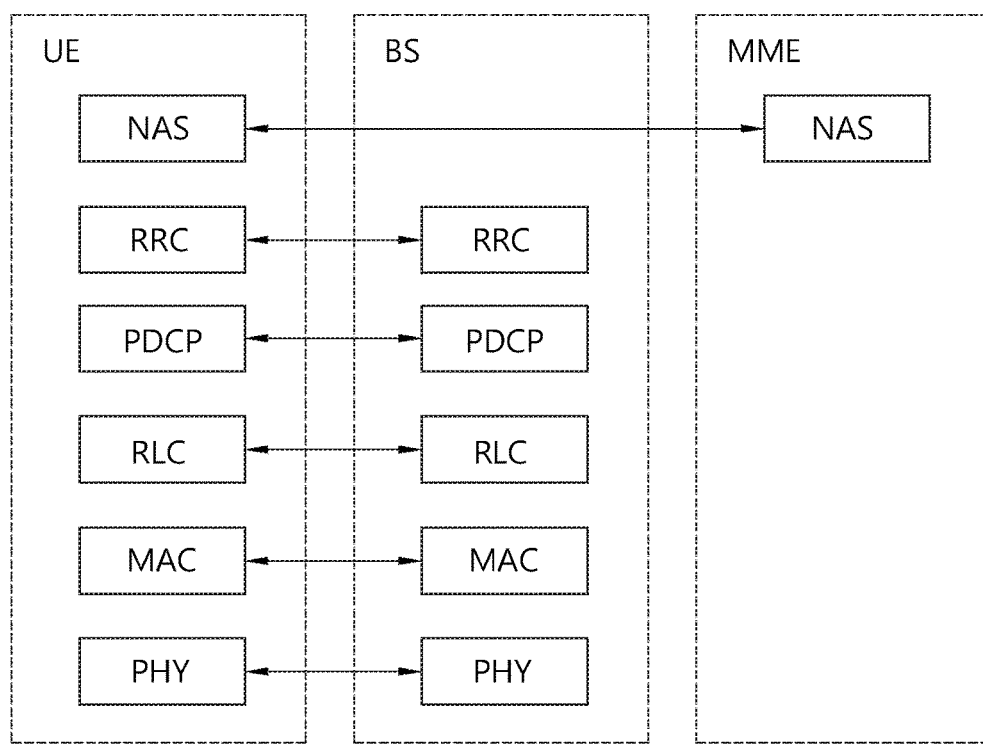
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configure value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
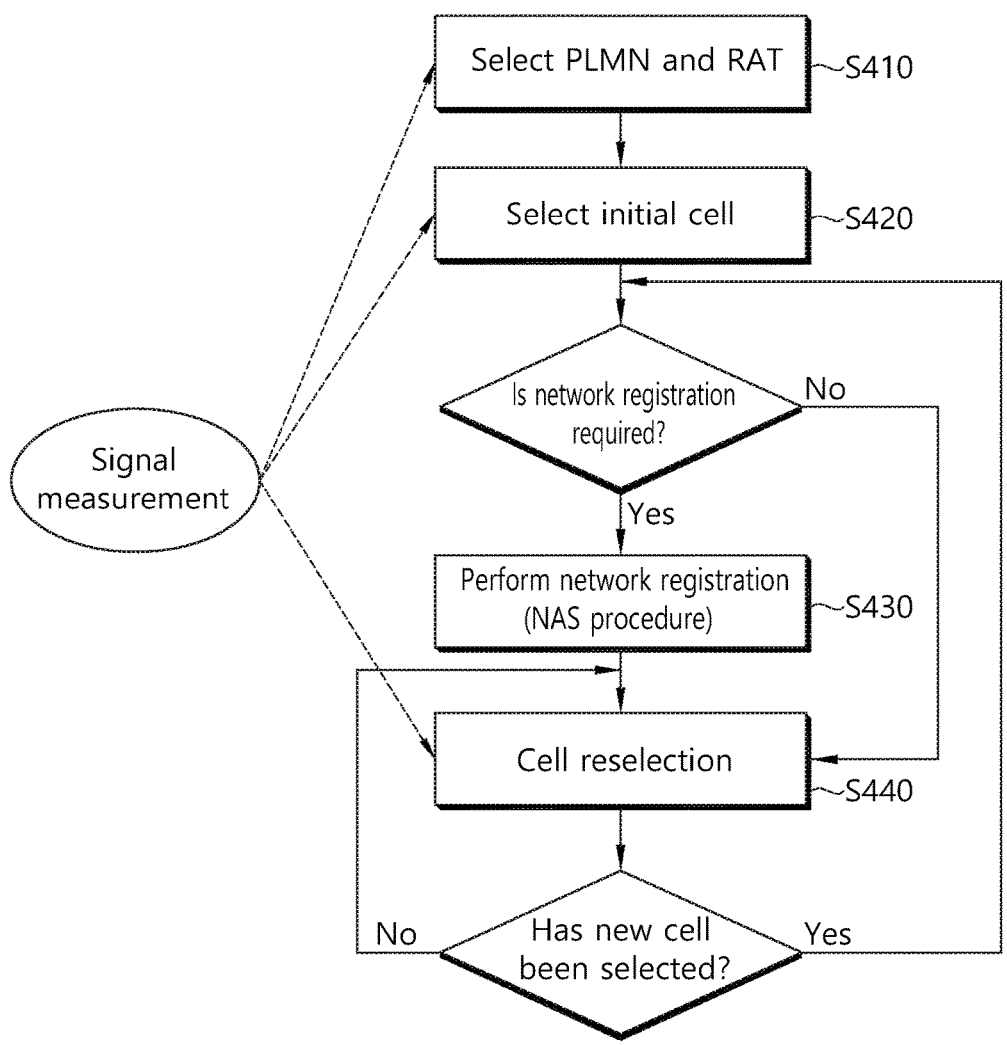
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in a data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
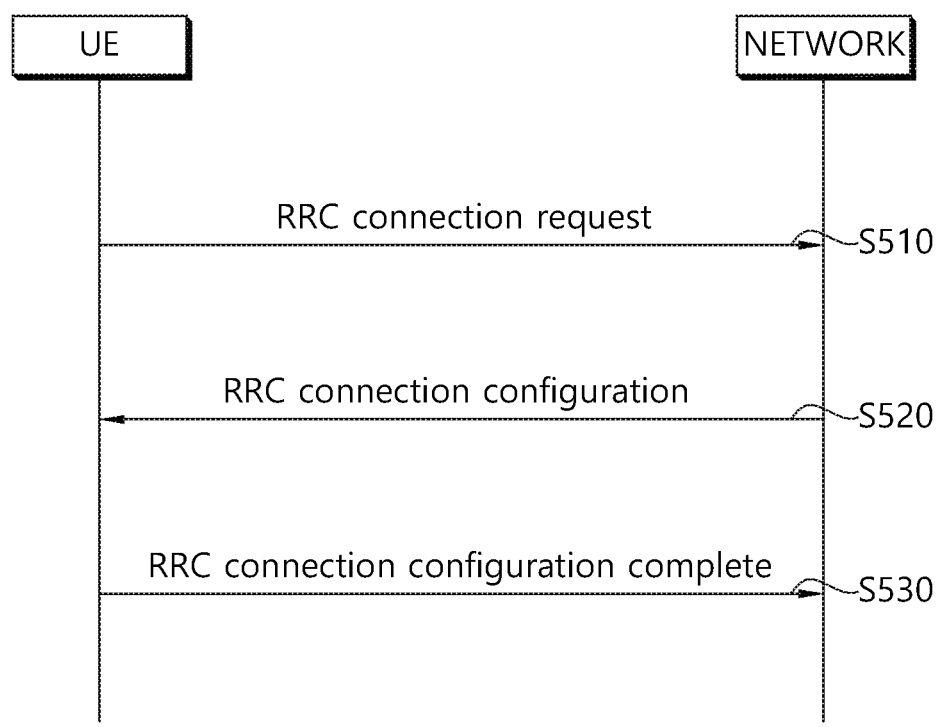
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
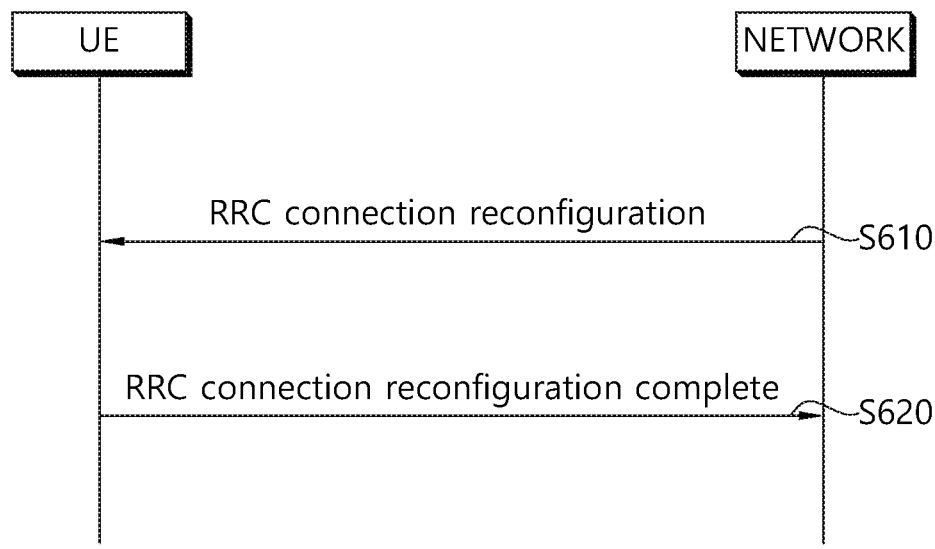
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection criterion may be defined as in Equation 1 below.

Srxlev>0 AND Squal>0, where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset}) \quad \text{[Equation 1]}$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection process, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to give the priority of a cell is defined as in Equation 2.

$$R_s = Q_{meas,s} + Q_{hyst}, R_n = Q_{meas,n} - Q_{offset} \quad \text{[Equation 2]}$$

In Equation 2, $R_s$ is the ranking criterion of a serving cell on which UE now camps, $R_n$ is the ranking criterion of a neighboring cell, $Q_{meas,s}$ is the quality value of the serving cell measured by the UE, $Q_{meas,n}$ is the quality value of the neighboring cell measured by the UE, $Q_{hyst}$ is a hysteresis value for ranking, and $Q_{offset}$ is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
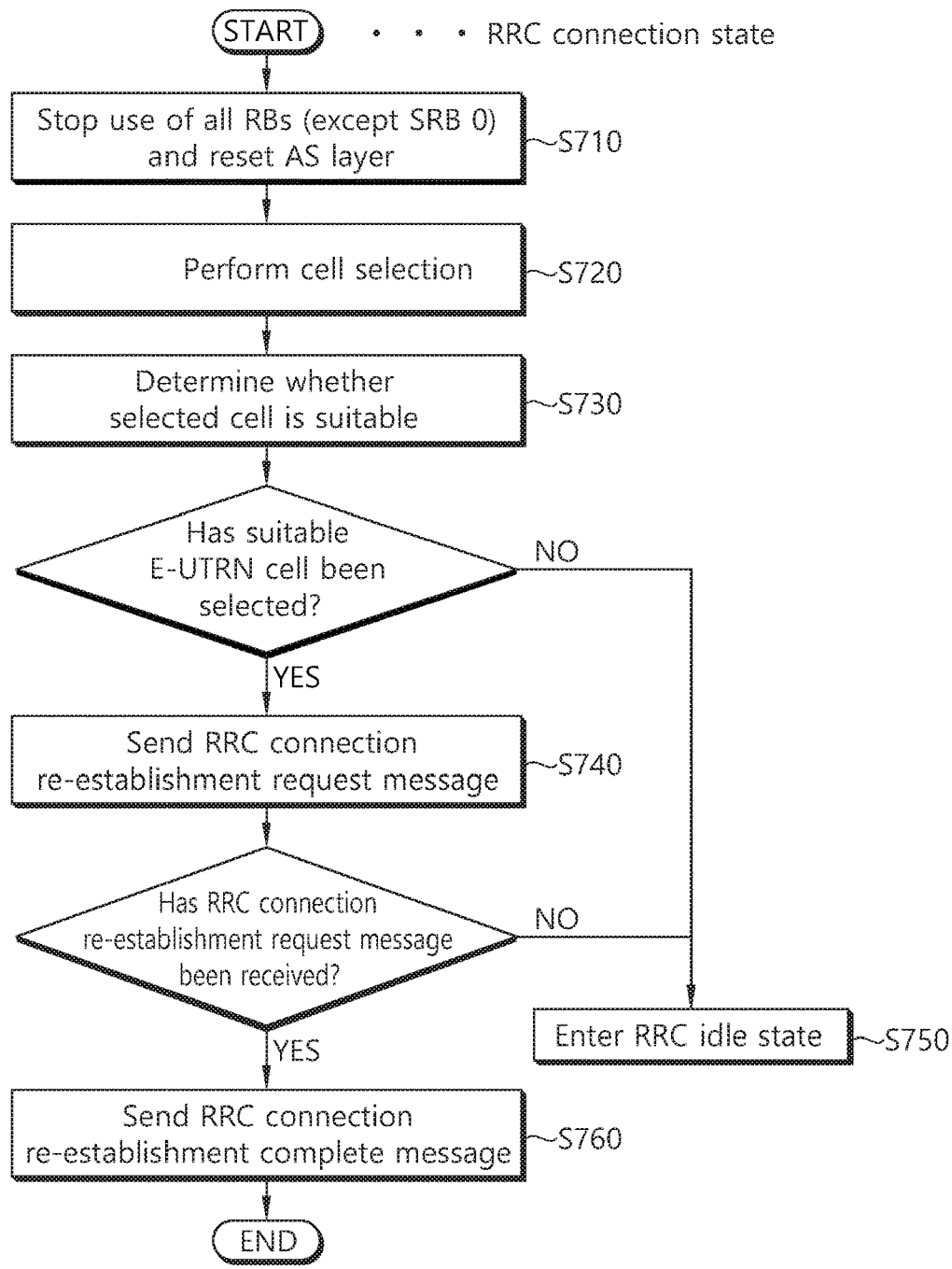
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

The present invention is now described.

Figure 8:
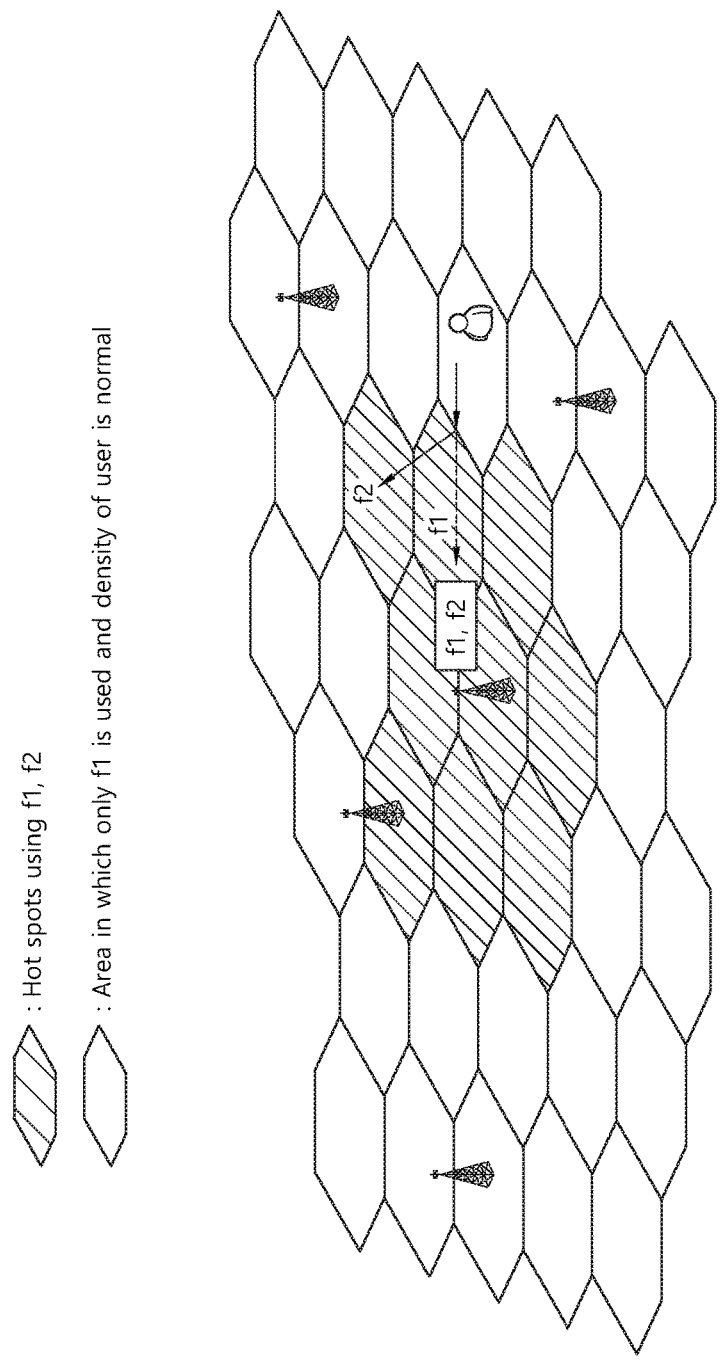
FIG. 8 illustrates frequency deployment scenarios to which the present invention may be applied.

FIG. 8 illustrates frequency deployment scenarios to which the present invention may be applied.

Referring to FIG. 8, the density of UE is different in each area. For example, the density of UE in a hot spot is higher than that in other areas.

In FIG. 8, in most of areas, the density of UE is normal and only an f1 carrier is deployed. In contrast, in an area called a hot spot in which the density of UE is high, a plurality of carriers, such as f1 and f2, may be deployed. For example, a wireless communication system operator may deploy a pico cell using the f2 frequency in a hot spot within coverage of a macro cell using the f1 frequency.

If UE moves from an area in which the density of UE is normal to a hot spot, the traffic of the UE may be segmented in order to achieve load balancing between the carriers of the hot spot.

When a cell reselection method for achieving load balancing is searched for, the following points need to be taken into consideration.

1. Limit of a Cell Reselection Mechanism Attributable to Broadcasted Priority

In accordance with a current cell reselection method, idle traffic loading for multiple carriers is distributed according to a priority value given to each carrier. If the priority value of a target carrier is higher than the priority value of a current serving carrier, most of pieces of UE within the current serving carrier may reselect the target carrier and perform cell reselection on cells in the target carrier as long as the target carrier has a better channel state. If not, all of pieces of UE in the current serving carrier may stay in the current serving carrier. In this case, from a viewpoint of a loading distribution, loading for a specific carrier may move to another carrier in an on/off type or may not move.

If the number of frequencies is small, the method provides a basic loading redistribution function. If the number of frequencies increases as in a carrier aggregation or a heterogeneous network (HetNet), such on/off type loading control may result in a severe problem. That is, in the current on/off type loading distribution, smooth load balancing cannot be performed between carriers.

In the case of carriers greater than 2, most of pieces of idle UE placed in carriers of lower priority may reselect carriers of higher priority. Accordingly, if priority is adjusted, a large-scale loading movement may occur between the carriers.

Such on/off type loading control is generated because a cell reselection process is performed based on a simple comparison of priority.

When such a point is taken into consideration, it may be seen that only a relative comparison between priority values affects the determination of cell reselection and a large-scale movement of idle traffic between carriers may be caused if the relative relation between the priority values is changed.

2. Limit of Cell Reselection Mechanism Attributable to Dedicated Priority

To use dedicated priority may be taken into consideration for idle traffic load balancing. If a plurality of carriers is available, however, various cases may occur, such as that traffic of a different percentage is required to be maintained in each carrier or a movement to another carrier is required depending on loading in a corresponding carrier. Furthermore, loading may vary depending on the time or location, and a different number of carriers may be used in a different coverage area. Accordingly, loading or the number of carriers may be required to be dynamically changed in different times and different areas with respect to moving idle UE. In order to provide proper dedicated priority to each of such various cases, excessively many signaling will be required.

Meanwhile, it is difficult to control many pieces of UE through dedicated priority in an overloading cell because dedicated priority can be allocated while UE has entered the idle state.

Furthermore, in an E-UTRAN, paging is requested in order to change the priority of frequencies with respect to idle UE. UE needs to enter RRC connection mode. In this case, the UE can update the priority of the frequencies, which results in unnecessary signaling overhead.

When such a point is taken into consideration, dedicated priority does not properly handle that traffic loading is changed depending on the time and location. A change of a carrier in each area requires a dynamic change of a priority value with respect to moving idle UE.

In order to perform a smooth redistribution of idle traffic between multiple carriers, a cell reselection process needs to be improved. A mechanism using dedicated priority is considered to not satisfy such a need. Accordingly, it seems to be appropriate that UE in the idle state controls an idle loading redistribution through broadcasted signaling.

3. Limit of Adjustment of Cell Reselection Measurement Threshold

A technology for controlling loading by adjusting a cell reselection measurement threshold may be taken into consideration. The cell reselection measurement threshold includes a power measurement threshold for received signal power. The adjustment of the power measurement threshold may change the coverage size of a cell. Accordingly, loading may be affected. However, the range of the adjustment of the power measurement threshold may be limited by coverage requirements that a hole be prevented from being generated in coverage of a macro cell, in particular.

Furthermore, it is difficult to use a cell reselection threshold for load balancing due to an unbalanced distribution of pieces of UE to different areas.

Figure 9:
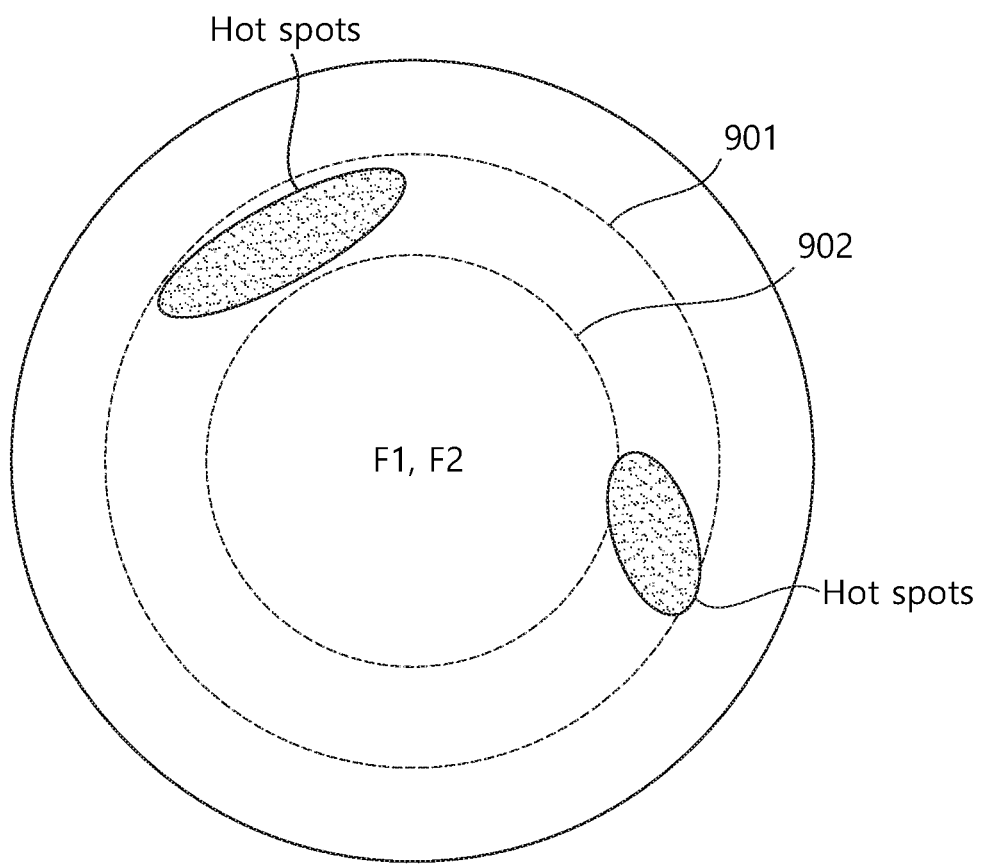
FIG. 9 shows that a change of a cell reselection threshold affects loading in the state in which pieces of UE have not been unevenly distributed.

FIG. 9 shows that a change of a cell reselection threshold affects loading in the state in which pieces of UE have not been unevenly distributed.

Referring to FIG. 9, coverage of a cell may be greatly changed due to a very small change of a cell reselection measurement threshold. For example, coverage of a cell may change from first coverage 901 to second coverage 902. In this case, hot spots in which many pieces of UE are distributed may be present between the first coverage 901 and the second coverage 902.

That is, in a specific value range of a cell reselection measurement threshold, cell coverage may be changed very sensitively. As a result, a small adjustment of the cell reselection measurement threshold may cause a great loading redistribution. In contrast, loading may be rarely changed although a cell reselection measurement threshold is greatly adjusted.

Furthermore, there may be a problem in that the same loading redistribution effect is not always achieved although the same cell reselection measurement threshold is changed due to an unbalanced distribution of UE. That is, a change of a cell reselection measurement threshold configuration may not be repeated in different cells. In other words, the adjustment of the same cell reselection measurement threshold may differently affect loading in different cells.

When such a point is taken into consideration, it is difficult to control loading by adjusting a cell reselection measurement threshold, and a cell reselection measurement threshold is more suitable for control of a cell coverage size or link quality.

4. Problems or Factors to be Taken into Consideration

In applying a cell reselection method, special UE groups may be separated and handled. In particular, pieces of evolved multimedia broadcast multicast service idle UE (eMBMS idle UE) may be separately taken into consideration.

eMBMS idle UE reselects an eMBMS carrier derived by an application program. Such UE has a mechanism for searching for a carrier for required eMBMS services. A network is unaware of the number of pieces of eMBMS idle UE in a cell in which an eMBMS service is used. Accordingly, to randomly redistribute pieces of eMBMS idle UE may conflict with a condition required for UE for an eMBMS service. Accordingly, pieces of eMBMS idle UE may be separately handled.

Furthermore, a UE group having specific requirements for grade of service (GoS) and quality of service (QoS) may be separately handled in order to take GoS/QoS requirements into consideration in loading control.

Meanwhile, in a cell reselection method for the redistribution of UE/traffic, it is better to avoid an approach method that requires many signaling in a change from the idle state to the RRC connection state and then to the idle state. The present mechanism is reused to a maximum extent, and backward compatibility needs to be taken into consideration.

When the aforementioned points are taken into consideration, in general, it is most efficient that a network signals a specific command to UE in the idle state in a broadcasted form.

Furthermore, if a large number of pieces of UE having the same priority is present in a serving carrier, the pieces of UE perform cell reselection on different target carriers in a probability that may be controlled based on a broadcasted command. The cell reselection probability of each of the pieces of UE is indicative of the percentage of idle UE that camps on a target carrier or stays in a current serving carrier.

In order to satisfy the GoS/QoS requirements, pieces of UE may be grouped with classes having different priorities for selecting specific carriers. A redistribution for each UE class may be used for cross-carrier loading control and resource allocation.

eMBMS-possible UE may be treated as a separate class. eMBMS-possible UE may be derived by an application program in order to select an eMBMS service-possible carrier. If there is no carrier capable of an eMBMS service, eMBMS UE may comply with the same redistribution rule as UE.

Cell reselection methods according to the present invention are described below. Cell reselection methods described in the following embodiments may be used for load balancing in an area using multiple carriers.

First Embodiment

UE may deprioritize a related frequency. In this case, the deprioritization may mean that the UE considers the related frequency to have a value lower than the lowest priority value that may be signaled by a network.

In a cell selection/reselection process to which deprioritization may be applied, UE may apply deprioritization based on network information/configuration or condition.

Figure 10:
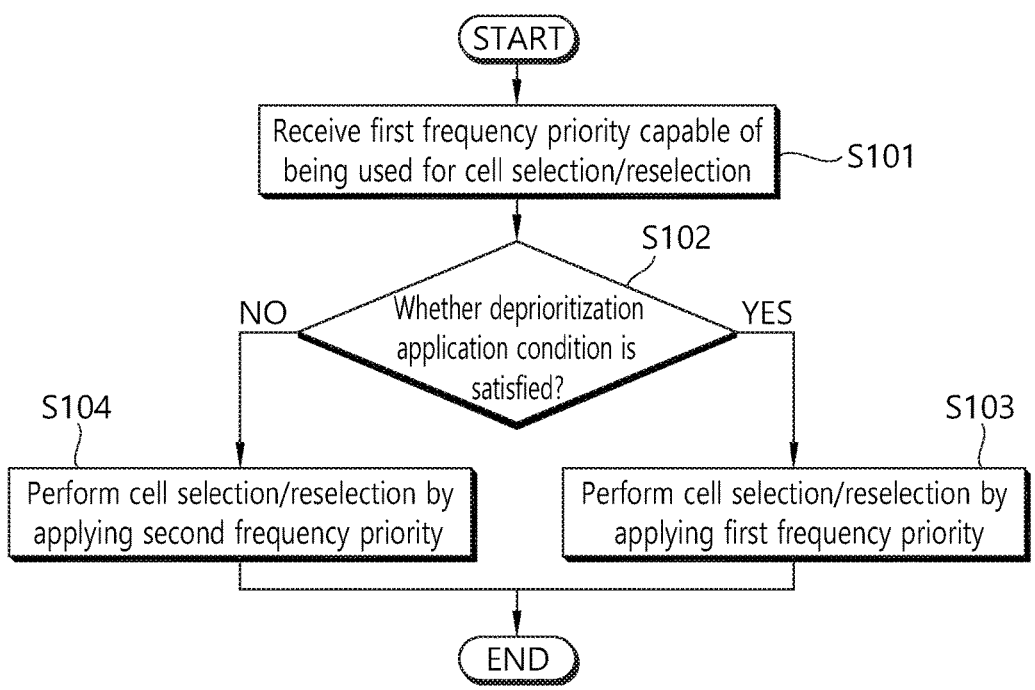
FIG. 10 shows a cell selection/reselection method according to the first embodiment.

FIG. 10 shows a cell selection/reselection method according to the first embodiment.

Referring to FIG. 10, UE receives a first frequency priority which may be used for cell selection/reselection from a network (S101). The first frequency priority is the priorities of frequencies used in cell selection/reselection by the UE. For example, it is assumed that available frequencies are f1, f2, and f3. If priority is given from a frequency having higher priority, the first frequency priority may be given in order of f2, f1, and f3.

The UE determines whether a deprioritization application condition is satisfied or not (S102). The deprioritization application condition is described later.

If the deprioritization application condition is satisfied, the UE performs cell selection/reselection by applying a second frequency priority (S103). If the related frequency is f2, the second frequency priority is that deprioritization has been applied to the first frequency priority and may be order of f1, f3, and f2, for example.

If the deprioritization application condition is satisfied, the UE performs cell selection/reselection by applying the first frequency priority (S104).

The deprioritization application condition according to a first embodiment is described below.

1) On/Off Indication

A network may transmit an on/off indicator through system information or a dedicated signal for UE. The on/off indicator may be indicative of whether the UE will apply deprioritization to a related frequency or not.

If an on/off indicator is not present for a corresponding frequency or an on/off indicator is indicative that deprioritization is not applied to the corresponding frequency, UE may apply a first frequency priority to the corresponding frequency. In contrast, if an on/off indicator is indicative that deprioritization is applied, UE may apply a second frequency priority to a corresponding frequency.

In the first embodiment, a network explicitly signals whether deprioritization will be applied to a specific frequency or not, and the value of such signaling is a condition regarding whether deprioritization will be applied or not.

2) Serving Cell Measurement-Based On/Off

A network may configure whether UE will apply deprioritization under which condition. For example, the network may configure a threshold for UE. If the threshold is provided, the UE may compare the threshold with a result of measurement for a serving cell. If the result of the measurement for the serving cell is higher than the threshold, the UE may apply deprioritization. If not, the UE may not apply deprioritization. The threshold may be reference signal received power (RSRP) or reference signal received quality (RSRQ) for the serving cell.

The above example does not have any limit, and the opposite may be applied. That is, if the result of the measurement for the serving cell is higher than the threshold, the UE may not apply deprioritization. If not, the UE may apply deprioritization.

A network provides a threshold by which whether deprioritization will be applied to a specific frequency can be determined. UE compares such a threshold with a result of measurement for a serving cell and determines whether or not to apply deprioritization.

3) Random Number-Based On/Off.

A network provides a threshold required to determine whether deprioritization will be applied to a corresponding frequency. The threshold may be provided through system information or a dedicated signal for UE. When receiving the threshold, the UE selects a random number within a specific range, compares the threshold with the selected random number, and applies deprioritization if a specific condition is satisfied.

For example, the UE randomly selects one of numbers 0 to 1 and compares the selected number with the threshold. It is assumed that the threshold is 0.7 and the selected number is 0.6. If the selected number is greater than the threshold, the UE may apply deprioritization and apply a second frequency priority. If the selected number is the threshold or less, the UE may apply a first frequency priority because deprioritization is not applied, and the vice versa.

The 1) to 3) conditions have been separately described, for convenience sake, but may be combined and applied. For example, deprioritization may be determined to be applied only when 1) the on/off indicator is indicative that deprioritization is applied and 3) a selected random number is greater than a threshold.

Meanwhile, if deprioritization has been determined to be applied, it also needs to determine how long will it be applied. A time interval in which deprioritization is applied may be signaled through system information or a dedicated signal for UE. Alternatively, a time interval in which deprioritization is applied may be predetermined.

The UE may start a timer when applying deprioritization, and may apply the original priority without applying the deprioritization when the timer expires.

Second Embodiment

Figure 11:
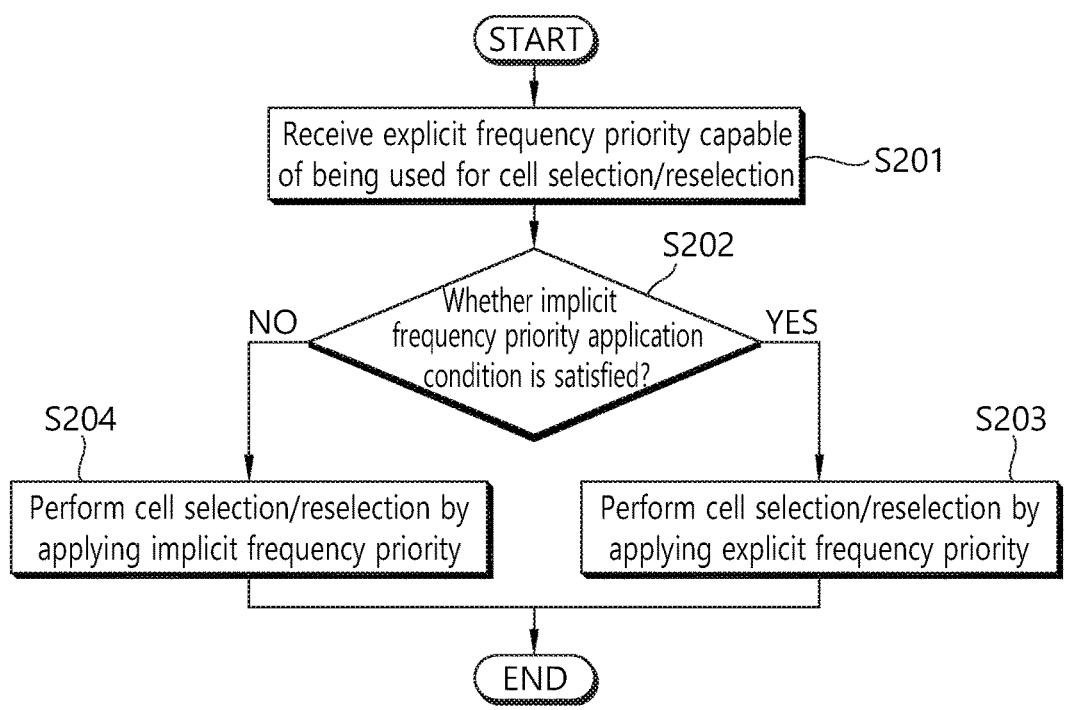
FIG. 11 shows a cell selection/reselection method according to a second embodiment.

FIG. 11 shows a cell selection/reselection method according to a second embodiment.

Referring to FIG. 11, UE receives an explicit frequency priority which may be used for cell selection/reselection from a network (S201). The explicit frequency priority is priority of frequencies used by the UE for cell selection/reselection and is priority explicitly given by the network.

The UE determines whether an implicit frequency priority application condition is satisfied (S202). The implicit frequency priority application condition is described later.

If the implicit frequency priority application condition is satisfied, the UE performs cell selection/reselection by applying an implicit frequency priority (S203). If the implicit frequency priority application condition is not satisfied, the UE performs cell selection/reselection by applying the explicit frequency priority (S204).

The implicit frequency priority is that the priority of a frequency lower than the priority of a related frequency is applied to the related frequency assuming that the explicit frequency priority of the related frequency has the highest priority. For example, the implicit frequency priority is that the priority of a frequency having a next priority is applied to a related frequency assuming that the explicit frequency priority of the related frequency has the highest priority.

For example, it is assumed that available frequencies are f1, f2, f3, and f4. If an explicit frequency priority is given from a frequency having a higher priority, it may be given in order of f2, f1, f3, and f4. It is assumed that UE camps on a cell having the frequency f1.

In this case, if an implicit frequency priority application condition is satisfied, the UE considers the frequency f1 to have the same priority as a frequency having priority subsequent to that of the frequency f1, that is, the priority of the frequency f3. Thereafter, the UE has only to determine cell reselection between frequencies having the same priority with respect to the frequencies f1 and f3.

The implicit frequency priority application condition according to a second embodiment is described below.

1) On/Off Indication

A network may transmit an on/off indicator through system information or a dedicated signal for UE. The on/off indicator may be indicative of whether the UE will apply an implicit frequency priority to a related frequency or not.

If an on/off indicator is not present for a corresponding frequency or an on/off indicator is indicative that an implicit frequency priority is not applied, UE may apply an explicit frequency priority to the corresponding frequency. In contrast, if the on/off indicator is indicative that the implicit frequency priority is applied, the UE applies the implicit frequency priority to the corresponding frequency.

2) Serving Cell Measurement-Based On/Off

A network may configure whether UE will apply an implicit frequency priority under which condition. For example, the network may configure a threshold for the UE. When the threshold is provided, the UE may compare the threshold with a result of measurement for a serving cell. If the result of the measurement for the serving cell is higher than the threshold, the UE may apply the implicit frequency priority. If not, the UE may not apply the implicit frequency priority. The threshold may be reference signal received power (RSRP) or reference signal received quality (RSRQ) for the serving cell. The above example does not have any limit, and the opposite may be applied. That is, if the result of the measurement for the serving cell is higher than the threshold, the UE may not apply the implicit frequency priority. If not, the UE may apply the implicit frequency priority.

3) Random Number-Based On/Off

A network provides a threshold required to determine whether or not to apply an implicit frequency priority to a corresponding frequency. The threshold may be provided through system information or a dedicated signal for UE. When receiving the threshold, the UE may select a random number within a specific range, may compare the selected random number with the threshold, and may apply the implicit frequency priority if a specific condition is satisfied.

For example, the UE selects any number of numbers 0 to 1 and compares the selected number with the threshold. It is assumed that the threshold is 0.7 and the selected number is 0.6. If the selected number is greater than the threshold, the UE applies the implicit frequency priority. If the selected number is the threshold or less, the UE may apply an explicit frequency priority without applying the implicit frequency priority, and the vice versa.

The 1) to 3) conditions have been separately described, for convenience sake, but may be combined and applied.

Meanwhile, when it is determined that an implicit frequency priority is applied, it also needs to determine how long will it be applied. A time interval in which the implicit frequency priority is applied may be signaled through system information or a dedicated signal for UE. Alternatively, the time interval in which the implicit frequency priority is applied may be predetermined.

The UE may start a timer when applying the implicit frequency priority, and may apply an explicit frequency priority without applying the implicit frequency priority when the timer expires.

Third Embodiment

Figure 12:
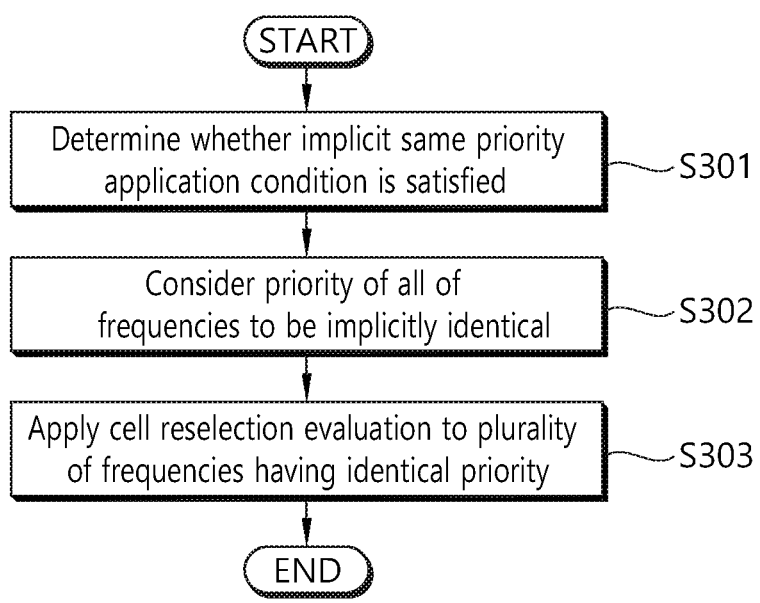
FIG. 12 shows a method for reselecting, by UE, a cell according to a third embodiment.

FIG. 12 shows a method for reselecting, by UE, a cell according to a third embodiment.

Referring to FIG. 12, UE determines whether an implicit same priority application condition is satisfied (S301). The condition is described later.

If the implicit same priority application condition is satisfied, the UE considers the priority of all of frequencies to be implicitly the same (S302). If the implicit same priority application condition is not satisfied, the UE performs cell selection/reselection by applying an existing frequency priority.

The UE applies cell reselection evaluation to a plurality of frequencies having the same priority (S303).

The UE receives an existing priority for all of frequencies having a corresponding frequency. If a specific condition is satisfied, the UE considers all the frequencies to implicitly have the same priority and performs a cell reselection process.

If the method is able to be applied to cell selection/reselection and the specific condition is satisfied, the UE may apply the method or may apply the method depending on network information/configuration.

The implicit same priority application condition is described below.

1) On/Off Indication

A network may transmit an on/off indicator through system information or a dedicated signal for UE. The on/off indicator may be indicative of whether the UE will apply an implicit same priority to all of frequencies including a related frequency.

If an on/off indicator is not present or the on/off indicator is indicative that the implicit same priority does not need to be applied, the UE may apply an existing frequency priority to a corresponding frequency. In contrast, if the on/off indicator is indicative that the implicit same priority needs to be applied, the UE considers the corresponding frequency to have the same priority as another frequency and performs cell selection/reselection.

2) Serving Cell Measurement-Based On/Off

A network may configure whether UE will apply an implicit same priority to all of frequencies under which condition. For example, the network may configure a threshold to the UE. When the threshold is provided, the UE may compare the threshold with a result of measurement for a serving cell. If the result of the measurement for the serving cell is higher than the threshold, the UE may apply the implicit same priority to all the frequencies. If not, the UE may not apply the implicit same priority. The threshold may be reference signal received power (RSRP) or reference signal received quality (RSRQ) for the serving cell. The above example does not have any limit, and the opposite may be applied. That is, if the result of the measurement for the serving cell is higher than the threshold, the UE may not apply the implicit same priority. If not, the UE may apply the implicit same priority.

3) Random Number-Based On/Off.

A network provides a threshold required to determine whether or not to apply an implicit same priority to a corresponding frequency. The threshold may be provided through system information or a dedicated signal for UE. When receiving the threshold, the UE selects a random number within a specific range, compares the selected random number with the threshold, and applies the implicit same priority if a specific condition is satisfied.

For example, the UE selects any number of numbers 0 to 1 and compares the selected number with the threshold. It is assumed that the threshold is 0.7 and the selected number is 0.6. If the selected number is greater than the threshold, the UE may apply the implicit same priority. If the selected number is the threshold or less, the UE may apply an existing frequency priority signaled by the network without applying the implicit same priority, and the opposite may be applied.

The 1) to 3) conditions have been separately described, for convenience sake, but may be combined and applied.

Meanwhile, when it is determined that an implicit same priority is applied to all of frequencies, it also needs to determine how long will it be applied. A time interval in which the implicit same priority is applied may be signaled through system information or a dedicated signal for UE. Alternatively, the time interval in which the implicit same priority is applied may be predetermined.

The UE starts a timer when applying the implicit same priority and may apply an existing frequency priority without applying the implicit same priority when the timer expires.

Fourth Embodiment

Figure 13:
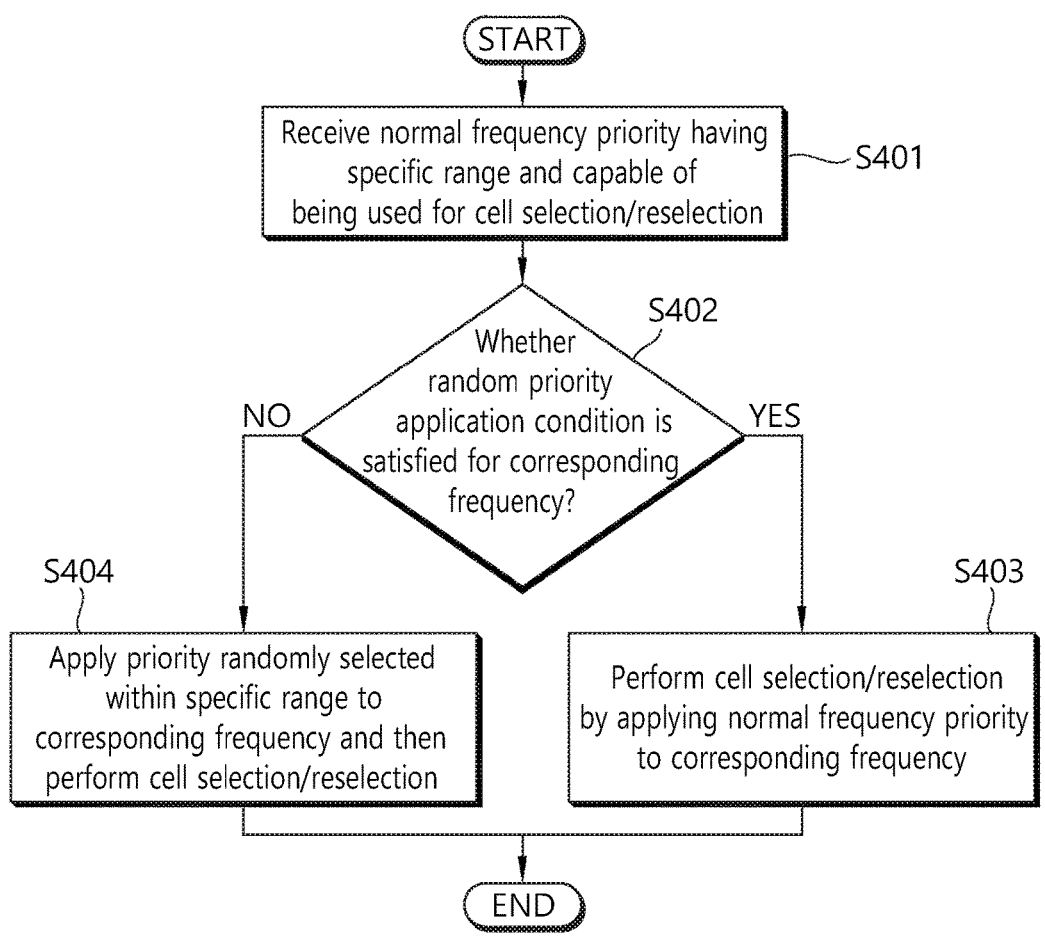
FIG. 13 shows a cell selection/reselection method according to a fourth embodiment.

FIG. 13 shows a cell selection/reselection method according to a fourth embodiment.

Referring to FIG. 13, UE receives a normal frequency priority having a specific range, which may be used for cell selection/reselection (S401).

The UE determines whether a random priority application condition is satisfied for a corresponding frequency (S402). The random priority application condition is described later.

If the random priority application condition is satisfied, the UE applies priority, randomly selected within the specific range, to the corresponding frequency and then performs cell selection/reselection (S403). For example, if a normal frequency priority is within a range of 0 to 7, the UE randomly selects one priority within the range of 0 to 7 with respect to the corresponding frequency. That is, the range of a priority value which may be randomly selected with respect to the corresponding frequency may be determined to be the same as the range of the normal frequency priority provided through system information.

If the random priority application condition is not satisfied, the UE applies the normal frequency priority to the corresponding frequency and performs cell selection/reselection (S404).

The random priority application condition is described below.

1) On/Off Indication

A network may transmit an on/off indicator through system information or a dedicated signal for UE. The on/off indicator may be indicative of whether the UE will apply random priority to a corresponding frequency.

If an on/off indicator is not present or the on/off indicator is indicative that the random priority does not need to be applied, the UE may apply a normal frequency priority to the corresponding frequency.

2) Serving Cell Measurement-Based On/Off

A network may configure whether UE will apply random priority to a corresponding frequency under which condition. For example, the network may configure a threshold for the UE. When the threshold is provided, the UE compares the threshold with a result of measurement for a serving cell. If the result of the measurement for the serving cell is higher than the threshold, the UE may apply the random priority to the corresponding frequency. If not, the UE may not apply the random priority. The threshold may be reference signal received power (RSRP) or reference signal received quality (RSRQ) for the serving cell. The above example does not have any limit, and the opposite may be applied. That is, if the result of the measurement for the serving cell is higher than the threshold, the UE may not apply the random priority. If not, the UE may apply the random priority.

3) Random Number-Based On/Off

A network may provide a threshold required to determine whether or not to apply random priority to a corresponding frequency. The threshold may be provided through system information or a dedicated signal for UE. When receiving the threshold, the UE selects a random number within a specific range, compares the selected random number with the threshold, and applies the random priority if a specific condition is satisfied.

For example, the UE selects any number of numbers 0 to 1 and compares the selected number with the threshold. It is assumed that the threshold is 0.7 and the selected number is 0.6. If the selected number is greater than the threshold, the UE may apply the random priority. If the selected number is the threshold or less, the UE may apply the normal frequency priority signaled by the network without applying the random priority, and the opposite may be applied.

The 1) to 3) conditions have been separately described, for convenience sake, but may be combined and applied.

Meanwhile, when it is determined that random priority is applied to a corresponding frequency, it also needs to determine how long will it be applied. A time interval in which the random priority is applied may be signaled through system information or a dedicated signal for UE. Alternatively, the time interval in which the random priority is applied may be predetermined.

The UE may start a timer when applying the random priority, and may apply the normal frequency priority signaled by the network without applying the random priority when the timer expires.

Fifth Embodiment

Figure 14:
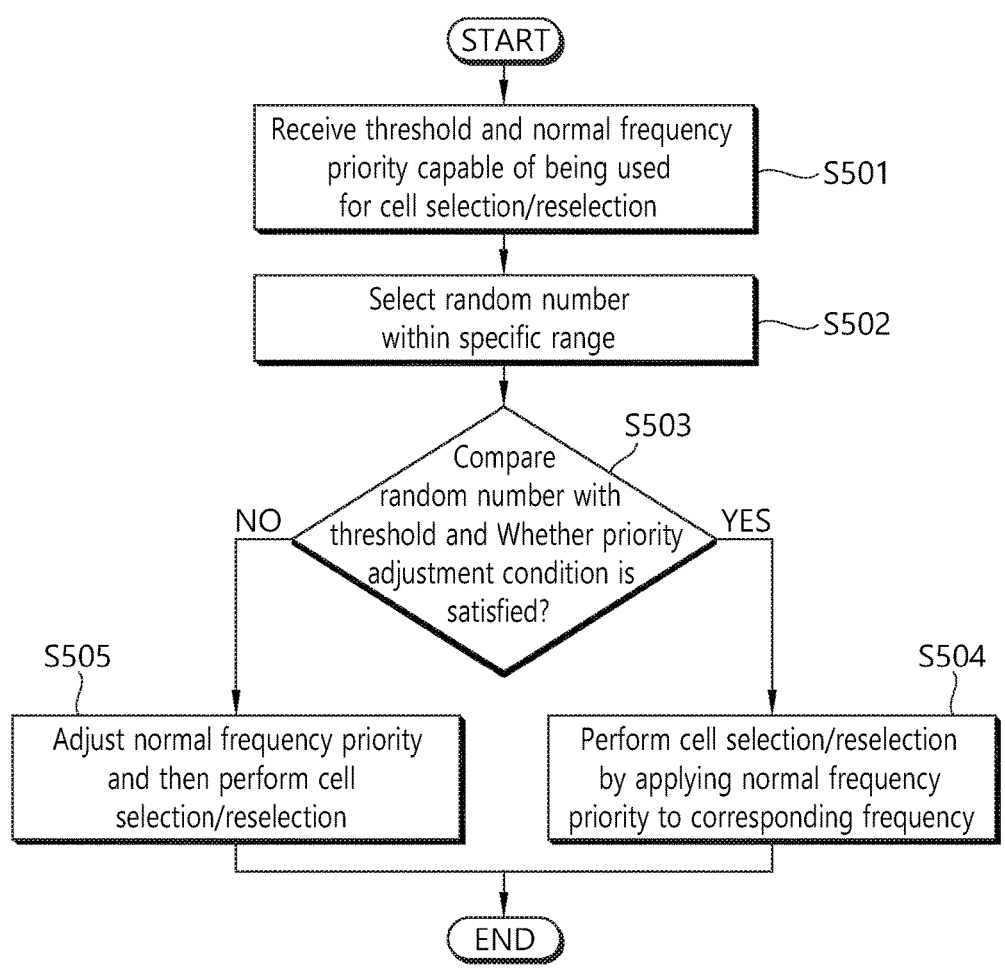
FIG. 14 shows a cell selection/reselection method according to a fifth embodiment.

FIG. 14 shows a cell selection/reselection method according to a fifth embodiment.

Referring to FIG. 14, UE receives a threshold and a normal frequency priority which may be used for cell selection/reselection from a network (S501). The threshold may be given for a corresponding frequency and may be provided through system information or a dedicated signal for the UE.

The UE selects a random number within a specific range (S502). The UE compares the random number with the threshold and determines whether a priority adjustment condition is satisfied (S503).

If the priority adjustment condition is satisfied, the UE adjusts the normal frequency priority and then performs cell selection/reselection (S504). If the priority adjustment condition is not satisfied, the UE performs cell selection/reselection by applying the normal frequency priority to the corresponding frequency (S505).

For example, the UE randomly selects any one number from numbers of 0 to 1 and compares the selected number with the threshold. It is assumed that the threshold is 0.7 and the selected number is 0.6. If the selected number is smaller than the threshold, the UE may adjust the normal frequency priority. If the selected number is the threshold or more, the UE may not adjust the normal frequency priority.

The priority of a normal frequency may be adjusted according to one of the following two methods.

1) If a normal frequency priority signaled by a network with respect to a corresponding frequency is P, an adjusted priority may be (P+P_adj). In this case, P_adj is a priority adjustment value and may be a value provided by the network or may be a predetermined value.

2) If a normal frequency priority signaled by a network with respect to a corresponding frequency is P, an adjusted priority may be (P+P_adj*random value). In this case, P_adj is a priority adjustment value and may be a value provided by the network or may be a predetermined value. The random value is a value randomly selected by UE and may be the random number at step S502 and may be a randomly selected value separately from the random number.

A condition in which priority is adjusted may be for satisfying any one of the followings.

1) On/Off Indication

If a network signals both the threshold described in connection with the fifth embodiment and a related parameter (e.g., P_adj), UE may consider that priority adjustment is needed. In contrast, if some of a required threshold and a related parameter is not provided, the UE may consider that priority adjustment is unnecessary.

2) Serving Cell Measurement-Based On/Off

A network may configure whether UE will apply priority adjustment to a corresponding frequency under which condition. For example, the network may configure a threshold for the UE. When the threshold is provided, the UE compares the threshold with a result of measurement for a serving cell. If the result of the measurement for the serving cell is higher than the threshold, the UE may perform the aforementioned operation S502 to S503. If not, the UE may not perform the aforementioned operation S502 to S503. The threshold may be reference signal received power (RSRP) or reference signal received quality (RSRQ) for the serving cell. The above example does not have any limit, and the opposite may be applied.

Meanwhile, priority adjustment may be treated as valid for only a specific time. The specific time may be provided through system information or a dedicated signal for UE by a network or may be a predetermined value.

UE initiates a validity timer when starting a process for adjusting priority for a corresponding frequency. Furthermore, when the validity timer expires after the specific time, the priority for the corresponding frequency returns to a normal frequency priority.

A network may set an additional limit condition on priority adjustment. For example, the network may configure a threshold for UE. When the threshold is provided, the UE compares the threshold with a result of measurement for a serving cell. If the result of the measurement for the serving cell is higher than the threshold, the UE may perform the aforementioned operation according to the fifth embodiment on a corresponding frequency. If not, the UE may not perform the operation according to the fifth embodiment.

Sixth Embodiment

When a network provides notification that idle mode redistribution is required through system information or a dedicated signal for UE, the UE may not take into consideration a result of measurement for a serving cell in cell reselection evaluation for frequencies having low priority.

Figure 15:
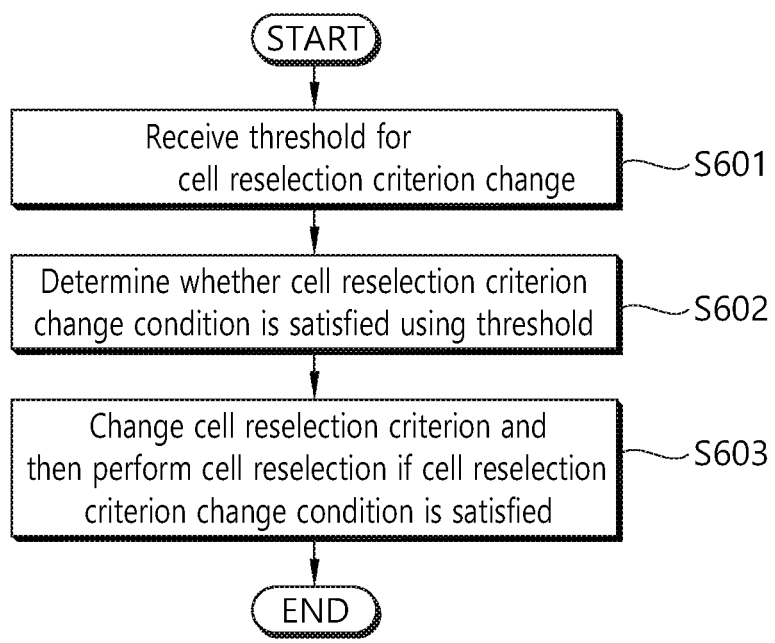
FIG. 15 illustrates a cell reselection method according to a sixth embodiment.

FIG. 15 illustrates a cell reselection method according to a sixth embodiment.

Referring to FIG. 15, UE receives a threshold for a cell reselection criterion change (S601). The UE determines whether the cell reselection criterion change condition is satisfied using the threshold (S602). If the cell reselection criterion change condition is satisfied, the UE changes a cell reselection criterion and then performs cell reselection (S603).

When receiving the threshold, the UE selects a random number within a specific range and then compares the selected random number with the threshold. If a specific condition is satisfied, the UE changers the cell reselection criterion. For example, the UE may select any number of numbers 0 to 1 and compare the selected number with the threshold. It is assumed that the threshold is 0.7 and the selected number is 0.6. If the selected number is smaller than the threshold, the UE changes the cell reselection criterion. If the selected number is equal to or greater than the threshold, the UE does not change the cell reselection criterion, and the opposite may be applied.

A detailed example of changing a cell reselection criterion is described below.

If the lowest quality threshold 'threshServingLowQ' of a serving cell is provided in a system information block, cell reselection in an E-URTRN frequency or inter-RAT frequency having lower priority than a current serving frequency is performed if 1) an E-UTRAN or UTRAN FDD RAT/frequency having low priority satisfies Squal>Thresh$_{X,LowQ}$ for a Treselection$_{RAT}$ time interval or 2) an UTRAN TDD, GERAN, or CDMA2000 RAT/frequency having low priority satisfies Srxlev>Thresh$_{X,LowP}$ for a Treselection$_{RAT}$ time interval and 3) UE has camped on a serving cell for 1 second or more. Thresh$_{X,LowQ}$ may be the lowest quality threshold of a cell, and Thresh$_{X,LowP}$ may be the lowest received power threshold of a cell.

In a related art, the 1) and 2) conditions include a condition in which a serving cell needs to satisfies Squal<Thresh$_{Serving,LowQ}$, but in the present invention, a cell reselection criterion is changed by deleting the condition. That is, in a related art, only when the quality of a serving cell is poorer than the lowest quality threshold and the quality of another frequency having lower priority than a serving cell is better than a specific threshold, cell reselection is performed on a cell of another frequency having low priority. In contrast, in the present invention, if the quality of another frequency having low priority is good regardless of the quality of a serving cell, a cell reselection criterion is changed so that cell reselection is performed on another frequency having low priority.

In contrast, if the lowest quality threshold 'threshServingLowQ' of a serving cell is not provided in a system information block, cell reselection in an E-UTRAN frequency or inter-RAT frequency having lower priority than a current serving frequency is performed if 1) an RAT/frequency having low priority satisfies Srxlev>Thresh$_{X,LowP}$ for a Treselection$_{RAT}$ time interval and 2) UE has camped on a serving cell for 1 second or more. In a related art, the 1) condition includes a condition in which a serving cell needs to satisfies Srxlev<Thresh$_{Serving,LowP}$, but in the present invention, a cell reselection criterion is changed by deleting the condition.

A network may signal an offset offset_Q added to Thresh$_{X,LowQ}$ or an offset offset_P added to Thresh$_{X,LowP}$. If such an offset is signaled, the aforementioned cell reselection criterion may be changed as follows.

If the lowest quality threshold 'threshServingLowQ' of a serving cell is provided in a system information block, cell reselection in an E-URTRN frequency or inter-RAT frequency having lower priority than a current serving frequency is performed if 1) an E-UTRAN or UTRAN FDD RAT/frequency having low priority satisfies Squal>Thresh$_{X,LowQ}$+offset_Q for a Treselection$_{RAT}$ time interval or 2) an UTRAN TDD, GERAN, or CDMA2000 RAT/frequency having low priority satisfies Srxlev>Thresh$_{X,LowP}$+offset_Q for a Treselection$_{RAT}$ time interval and 3) UE has camped on a serving cell for 1 second or more.

If the lowest quality threshold 'threshServingLowQ' of a serving cell is not provided in a system information block, cell reselection in an E-UTRAN frequency or inter-RAT frequency having lower priority than a current serving frequency is performed if 1) an RAT/frequency having low priority satisfies Srxlev>Thresh$_{X,LowP}$+offset_P for a Treselection$_{RAT}$ time interval and 2) UE has camped on a serving cell for 1 second or more.

Figure 16:
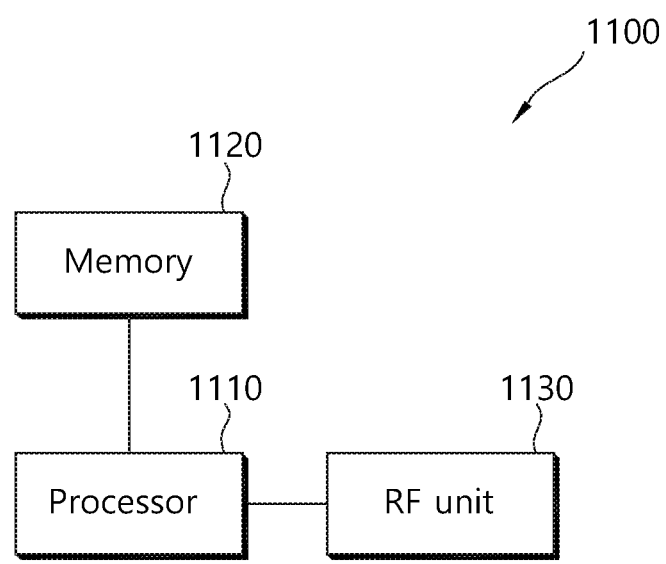
FIG. 16 is a diagram illustrating the configuration of a UE device according to the present invention.

FIG. 16 is a diagram illustrating the configuration of a UE device according to the present invention.

Referring to FIG. 16, the UE device 1100 includes a processor 1110, memory 1120, and a radio frequency (RF) unit 1130. The processor 1110 implements the proposed functions, processes and/or methods. For example, the processor 1110 may operate according to each of the aforementioned methods of the first embodiment to the sixth embodiment.

The RF unit 1130 is connected to the processor 1110 and transmits and receives radio signals.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When an embodiment is implemented in software, the aforementioned scheme may be implemented using a module (process or function, etc.) which performs the aforementioned function. The module may be stored in the memory and executed by the processor. The memory may be deployed to the processor internally or externally and connected to the processor using a variety of well-known means.

What is claimed is:

1. A method for reselecting a cell, the method performed by a user equipment and comprising:
   receiving a threshold and a normal frequency priority for cell reselection;
   selecting a random number within a specific range;
   comparing the selected random number with the received threshold;
   determining whether a condition in which a priority according to the normal frequency priority is adjusted is satisfied with respect to a specific frequency;
   adjusting the priority for the specific frequency if the condition is satisfied; and
   performing the cell reselection based on the adjusted priority.

2. The method of claim 1, further comprising receiving a priority adjustment value,
   wherein the priority for the specific frequency is adjusted according to the priority adjustment value if the condition is satisfied.

3. The method of claim 2, wherein the priority adjustment value is a predetermined value or is received from a network.

4. The method of claim 1, further comprising receiving a priority adjustment value,
   wherein the priority is adjusted according to a product of the priority adjustment value and the selected random number if the condition is satisfied.

5. The method of claim 4, wherein the condition is satisfied if both the threshold and the priority adjustment value are received.

6. A user equipment (UE) performing cell reselection, the UE comprising:
- a radio frequency (RF) unit transmitting and receiving radio signals; and
- a processor connected to the RF unit, wherein the processor is configured to:
- control the RF unit to receive a threshold and a normal frequency priority for cell reselection;
- select a random number within a specific range;
- compare the selected random number with the received threshold;
- determine whether a condition in which a priority according to the normal frequency priority is adjusted is satisfied with respect to a specific frequency;
- adjust the priority for the specific frequency if the condition is satisfied; and
- perform the cell reselection based on the adjusted priority.

7. The apparatus of claim 6, wherein:
- the processor is further configured to control the RF unit to receive a priority adjustment value; and
- the priority for the specific frequency is adjusted according to the priority adjustment value if the condition is satisfied.

8. The apparatus of claim 7, wherein the priority adjustment value is a predetermined value or is received from a network.

9. The apparatus of claim 6, wherein:
- the processor is further configured to control the RF unit to receive a priority adjustment value; and
- the priority is adjusted according to a product of the priority adjustment value and the selected random number if the condition is satisfied.

10. The apparatus of claim 9, wherein the condition is satisfied if both the threshold and the priority adjustment value are received.

* * * * *